US012676480B2

(12) United States Patent
Kendzia, III et al.

(10) Patent No.: US 12,676,480 B2
(45) Date of Patent: Jul. 7, 2026

(54) STATIC TRANSFER SWITCH WITH AUTOMATIC STARTUP

(71) Applicant: ABB SCHWEIZ AG, Baden (CH)

(72) Inventors: Thomas Anthony Kendzia, III, Rockville, VA (US); Veerakumar Bose, Richmond, VA (US)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 18/641,981

(22) Filed: Apr. 22, 2024

(65) Prior Publication Data

US 2025/0330017 A1      Oct. 23, 2025

(51) Int. Cl.
H02J 3/007 (2026.01)

(52) U.S. Cl.
CPC .................................... H02J 3/007 (2020.01)

(58) Field of Classification Search
CPC ...................................................... H02J 3/007
USPC .......................................................... 307/64
See application file for complete search history.

(56) References Cited

U.S. PATENT DOCUMENTS 5,386,147 A * 1/1995 Bonneau ................. H02J 9/061
                                                                    307/64
5,770,897 A * 6/1998 Bapat ........................ H02J 9/06
                                                                    307/64

| 2006/0226706 A1* | 10/2006 | Edelen | H02J 9/062 |
| | | | 307/64 |
| 2021/0028621 A1* | 1/2021 | Oudrhiri | H02J 3/007 |
| 2021/0249898 A1* | 8/2021 | Schecter | H02J 9/062 |
| 2024/0030741 A1* | 1/2024 | Bose | H02J 9/068 |
| 2024/0380237 A1* | 11/2024 | Yuan | H02J 9/068 |

FOREIGN PATENT DOCUMENTS

| CN | 217115628 U | 8/2022 |
| CN | 115800490 A | 3/2023 |

OTHER PUBLICATIONS

Fulgenzi, et al., "UPS Interconnected with STS to Improve Power-Supply Continuity in the Gran Sasso National Laboratory", 2002, IEEE, vol. 1, pp. 260-264; 5 pages.
International Search Report and Written Opinion for International Patent Application No. PCT/US2025025578, mailed Sep. 16, 2025; 26 pages.

* cited by examiner

*Primary Examiner* — Richard Tan
(74) *Attorney, Agent, or Firm* — Greenberg Traurig, LLP

(57) ABSTRACT

The disclosed system for automatic startup for a static transfer switch (STS) includes multiple controlled switches for connecting to multiple power sources, and an output controlled switch for connecting to a load. The system also includes an STS circuit selectively coupled between the controlled switches and the output controlled switch. The system further includes a controller that monitors the power sources and the load and control the controlled switches and the output controlled switch. Various other methods, systems, and computer-readable media are also disclosed.

20 Claims, 4 Drawing Sheets

100

```
┌─────────────────┐                              ┌─────────────────┐
│  Power Source   │                              │  Power Source   │
│      112A       │                              │      112B       │
└─────────────────┘                              └─────────────────┘
```

Static Transfer Switch
110

```
┌──────────────────┐   ┌──────────────┐   ┌──────────────────┐
│ Controlled Switch │   │   Sensors    │   │ Controlled Switch │
│       120A        │   │     132      │   │       120B        │
└──────────────────┘   └──────────────┘   └──────────────────┘

┌────────────────────┐  ┌──────────────┐  ┌────────────────────┐
│ Semiconductor Switch│  │  Controller  │  │ Semiconductor Switch│
│        122A         │  │     130      │  │        122B         │
└────────────────────┘  └──────────────┘  └────────────────────┘

┌──────────────────────────┐
              │  Output Controlled Switch │
              │            124            │
              └──────────────────────────┘
```

```
┌─────────────────┐
│      Load       │
│      114        │
└─────────────────┘
```

Method
400

STATIC TRANSFER SWITCH WITH AUTOMATIC STARTUP

BACKGROUND

A static transfer switch (STS) may use power semiconductors for transferring a load between one or more electrical power sources to provide the load with an available power supply. For example, an STS may monitor the power sources and selects an available option when a connected power source fails. An STS may provide fast switching to provide reliable power to loads such as servers, data centers, and other sensitive/critical electrical loads.

A traditional STS may require a manual startup or initiation by an operator at all stages of life. For example, when first activating an STS or reactivating an STS (e.g., after a blackout event, unplanned outage event, or other complete shutdown), the operator may manually verify safe conditions for various stages of the start-up sequence as the traditional STS may lack hardware to address failure conditions.

BRIEF DESCRIPTION OF THE DRAWINGS

The accompanying drawings illustrate a number of exemplary implementations and are a part of the specification. Together with the following description, these drawings demonstrate and explain various principles of the present disclosure.

FIG. 1 is a block diagram of an exemplary static transfer switch (STS).

Figure 2:
FIG. 2 is a simplified circuit diagram of another exemplary STS.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the present disclosure covers all modifications, equivalents, and alternatives falling within the scope of the appended claims.

DETAILED DESCRIPTION

The present disclosure is generally directed to an STS with automatic startup/initiation. As will be explained in greater detail below, implementations of the present disclosure include controlled switches that can be opened and closed based on various connection health assessments at various stages of the STS. For example, a control circuit may monitor power sources and/or a load and accordingly control the controlled switches to make appropriate power connections. By monitoring the various stages and controlling the controlled switches to connect power sources without exhibiting failure conditions, the systems and methods provided herein may advantageously improve efficiency and performance of an STS, for instance improving a reliability and/or speed of a startup/initiation sequence.

In one implementation, a system for automatic startup for an STS includes a plurality of controlled switches corresponding to a plurality of power sources, an output controlled switch corresponding to a load, a static transfer switch (STS) circuit selectively coupled between the plurality of controlled switches and the output controlled switch, and a controller configured to monitor the plurality of power sources and the load and control the plurality of controlled switches and the output controlled switch.

In some examples, the controller is configured to: (i) determine, in response to initiating the STS circuit, a first status of a first power source of the plurality of power sources, (ii) connect the first power source to the STS circuit in response to the first status satisfying a health threshold by closing a corresponding first controlled switch of the plurality of controlled switches, (iii) enable a power connection through the STS circuit from the first power source to the load, (iv) determine a second status of a second power source of the plurality of power sources, and (v) connect the second power source to the STS circuit in response to the second status satisfying the health threshold.

In some examples, the system further comprises a semiconductor switch for each of the plurality of power sources, wherein each semiconductor switch is selectively coupled between a respective one the plurality of controlled switches and the STS circuit. In some examples, connecting the first power source to the STS circuit further includes determining a pre-gate status of a power stage of the STS circuit after closing the first controlled switch, and closing, in response to the pre-gate status satisfying a pre-gate threshold, the corresponding semiconductor switch. In some examples, enabling the power connection further comprises determining a post-gate status of the power stage of the STS circuit after closing the semiconductor switch.

In some examples, the controller is further configured to determine a load health status after enabling the power connection. In some examples, the controller is further configured to perform a mitigating action in response to detecting a failure status, and the mitigating action corresponds to at least one of: reporting the failure status, disconnecting an associated connection, or attempting an alternate power source.

In one implementation, a method for automatically starting up an STS includes (i) determining, in response to initiating a static transfer switch (STS) circuit, a first status of a first power source of a plurality of power sources, (ii) connecting the first power source to the STS circuit in response to the first status satisfying a health threshold, (iii) enabling a power connection through the STS circuit from the first power source to a load, (iv) determining a second status of a second power source, and (v) connecting the second power source to the STS circuit in response to the second status satisfying the health threshold.

In some examples, the first power source corresponds to a preferred power source. In some examples, connecting the first power source to the STS circuit includes closing a controlled switch that is selectively coupled between the STS circuit and the first power source. In some examples, connecting the first power source to the STS circuit further includes determining a pre-gate status of a power stage of the STS circuit after closing the controlled switch, and closing, in response to the pre-gate status satisfying a pre-gate threshold, a semiconductor switch selectively coupled between the controlled switch and the STS circuit.

In some examples, the pre-gate threshold corresponds to a power surge. In some examples, enabling the power connection further comprises determining a post-gate status of the power stage of the STS circuit after closing the semiconductor switch.

In some examples, the method further comprises determining a load health status after enabling the power connection. In some examples, connecting the second power source to the STS circuit includes closing a second controlled switch that is selectively coupled between the STS circuit and the second power source. In some examples, the method further comprises locking the second controlled switch before determining the first status. In some examples, determining the second status further comprises unlocking the second controlled switch. In some examples, the first status corresponds to a voltage measurement and the health threshold corresponds to a voltage threshold.

In some examples, the method further comprises performing a mitigating action in response to detecting a failure status, wherein the mitigating action corresponds to at least one of: reporting the failure status, disconnecting an associated connection, or attempting an alternate power source.

In one implementation, a controller for automatically starting up an STS may be configured to perform operations comprising: (i) determining, in response to initiating a static transfer switch (STS) circuit, a first status of a first power source of a plurality of power sources, (ii) connecting the first power source to the STS circuit in response to the first status satisfying a health threshold, (iii) enabling a power connection through the STS circuit from the first power source to a load, (iv) determining a second status of a second power source, and (v) connecting the second power source to the STS circuit in response to the second status satisfying the health threshold.

Features from any of the implementations described herein can be used in combination with one another in accordance with the general principles described herein. These and other implementations, features, and advantages will be more fully understood upon reading the following detailed description in conjunction with the accompanying drawings and claims.

The following will provide, with reference to FIGS. 1-4, detailed descriptions of static transfer switches with automatic startup. Detailed descriptions of example systems will be provided in connection with FIGS. 1 and 2. Detailed descriptions of corresponding processes or methods will also be provided in connection with FIGS. 3 and 4.

FIG. 1 illustrates a system 100 including a power source 112A, a power source 112B, a static transfer switch 110, and a load 114. Power source 112A and power source 112B may each correspond to various power sources/supplies, including but not limited to AC power sources, batteries, generators, etc. Load 114 may correspond to any electrical power load, such as a one or more computing devices and/or any system powered by electricity. STS 110 may correspond to an STS for facilitating a reliable power connection to load 114, such as by selecting and/or switching between power source 112A and power source 112B as needed. For example, STS 110 may connect power source 112A to load 114 and upon detecting a failure to power source 112A, automatically switch load 114 to power source 112B (and/or vice versa). Although not illustrated in FIG. 1, in other examples, STS 110 may be configured to manage connections to additional or fewer power sources.

As further illustrated in FIG. 1, STS 110 includes a controlled switch 120A, a controlled switch 120B, a semiconductor switch 122A, a semiconductor switch 122B, an output controlled switch 124, a controller 130, and sensors 132. Controlled switch 120A, controlled switch 120B, and output controlled switch 124 may each correspond to a contactor, although in other examples may correspond to a controllable switch configured for a power connection, such as a circuit breaker having a controllable open or closed connection. Semiconductor switch 122A and semiconductor switch 122B may each correspond to an AC switch, such as a solid state thyristor, a metal-oxide-semiconductor field-effect transistor (MOSFET), a rectifier, and/or other semiconductor-based controllable switch configured for a power connection. Controller 130 may correspond to one or more circuits (which in some examples may include a processor and/or other logic) that may control switches (e.g., one or more of controlled switch 120A, controlled switch 120B, semiconductor switch 122A, semiconductor switch 122B, and/or output controlled switch 124) based on sensors 132, as will be described further below. Sensors 132 may correspond to one or more sensors for measuring and/or detecting conditions relating to health statuses and/or failure conditions of various stages of STS 110 (e.g., at points between each of the switches and/or power source 112A, power source 112B, and/or load 114). Sensors 132 may correspond to sensors for detecting, for example, electrical properties (e.g., voltage, current, frequency, etc., and/or derivations thereof, such as changes, comparisons to relevant thresholds, etc.).

STS 110 may selectively couple load 114 to power source 112A or power source 112B (and in some examples, neither). In one example, controller 130 may, based on measurements from sensors 132 (e.g., at each stage, detect no failure conditions with respect to power source 112A and accordingly control controlled switch 120A, semiconductor switch 122A, and output controlled switch 124 to connect power source 112A to load 114. Controller 130 may also determine a health status of power source 112B in order to designate power source 112B as available for switching upon a failure of power source 112A. In some examples, controller 130 may take a mitigating action in response to detecting a failure status. A mitigating action may correspond to one or more actions directed to addressing (e.g., alerting to and/or mitigating potential system damage) a particular failure condition, such as reporting the failure status, disconnecting an associated connection, and/or attempting an alternate power source.

FIG. 2 illustrates a simplified circuit diagram of a system 200 corresponding to system 100. FIG. 2 illustrates system 200 including a power source 212A (corresponding to power source 112A), a power source 212B (corresponding to power source 112B), a static transfer switch circuit 210 (corresponding to STS 110), and a load 214 (corresponding to load 114). Although not illustrated in FIG. 2, in other examples, STS circuit 210 may be configured to manage connections to additional or fewer power sources.

As further illustrated in FIG. 2, STS circuit 210 includes a controlled switch 220A (corresponding to controlled switch 120A), a controlled switch 220B (corresponding to controlled switch 120B), a semiconductor switch 222A (corresponding to semiconductor switch 122A), a semiconductor switch 222B (corresponding to semiconductor switch 122B), an output controlled switch 224 (corresponding to output controlled switch 124). FIG. 2 further illustrates various nodes corresponding to sensors (e.g., sensors 132) and/or representative connection points thereof. For instance, FIG. 2 illustrates a sensor 232A, a sensor 232B, a sensor 232C, a sensor 232D, a sensor 232E, and a sensor 232F. Further, although not shown in FIG. 2, STS circuit 210 may include, be integrated with, and/or otherwise be connected to a controller (e.g., controller 130) coupled to sensors 232A-F.

In one example, during an initiation or start-up of STS circuit 210 (e.g., when first powering on or restarting after a power outage event), the controller may determine a health status of a preferred source, such as power source 212B. The controller may determine a health status of a stage corresponding to sensor 232B. Upon detecting no failure condition relating to sensor 232B and/or its corresponding stage, the controller may close controlled switch 220B. The controller may then determine a health status of a stage corresponding to sensor 232D. Upon detecting no failure condition relating to sensor 232D and/or its corresponding stage, the controller may close semiconductor switch 222B. The controller may further determine a health status of a stage corresponding to sensor 232E. Upon detecting no failure condition relating to sensor 232E and/or its corresponding stage, the controller may close output controlled switch 224, which may provide a power connection to load 214 (e.g., from power source 212B having passed all health checks). In some examples, the controller may check a health status associated with load 214 via sensor 232F before and/or after closing output controlled switch 224, and perform a mitigating action upon detecting a failure. For example, at any given stage, if the controller detects a failure status, the controller may disconnect the corresponding switch (and/or other intervening switches to power source 212B), and/or report such failures.

In some examples, the controller may further determine a health status of an alternative source, such as power source 212A. For example, similar to the above description, the controller may successively check each stage (e.g., at sensor 232A and sensor 232C) and upon no detection of a failure status, connect the appropriate switch to check a next stage. However, the controller may not close semiconductor switch 222A so as not to connect power source 212A, unless a failure with power source 212B is detected.

In other examples, the preferred and alternative sources may be switched, and additional power sources (not illustrated in FIG. 2) may be connected, which STS circuit 210 having additional iterations of components (e.g., sensors, controlled switches, semiconductor switches) as needed.

Figure 3:
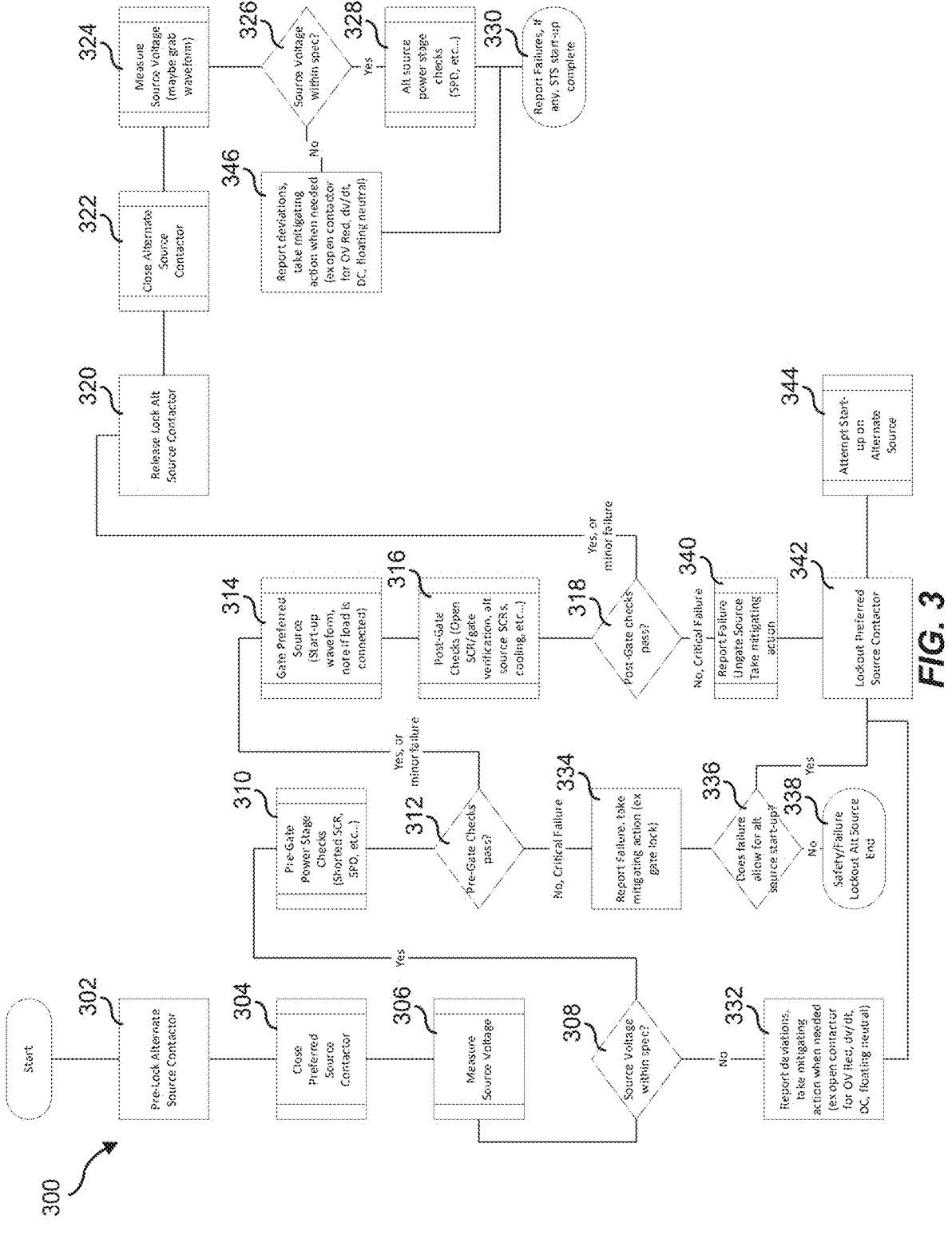
FIG. 3 is a flow diagram of an exemplary process for automatic startup of an STS.

FIG. 3 illustrates a flow chart 300 of an example initiation or start-up process for an STS, such as STS 110 and/or STS circuit 210. At step 302, the controller (e.g., controller 130) may pre-lock an alternate source contactor (e.g., controlled switch 220A). At step 304, the controller may close a preferred source contactor (e.g., controlled switch 220B). At step 306, the controller may measure a source voltage (e.g., using sensor 232D and/or sensor 232B). At step 308, the controller may determine with the source voltage is within spec (e.g., one or more safe voltage thresholds). If the voltage is not within spec, the process may continue to step 332 described below.

Otherwise (if the source voltage satisfies the voltage thresholds), at step 310, the controller may perform pre-gate power stage checks (e.g., using sensor 232D) such as checking for shorted rectifiers (e.g., silicon controlled rectifiers (SCR)), checking surge protective devices (SPD), etc. At step 312, if the controller detects a critical failure for the pre-gate power stage check, the process may continue to step 334, described further below.

Continuing to step 314, in response to passing the pre-gate checks or otherwise encountering minor failures (e.g., non-critical failures), the controller may gate the preferred source, which in some examples may include checking a start-up waveform, noting if the load (e.g., load 214) is connected, etc. At step 316, the controller may perform post-gate checks (e.g., using sensor 232E) that may include gate verification, opening rectifiers, checking alternative source rectifiers, sufficient cooling of components, etc. At step 318, the controller may determine whether the post-gate checks pass. If the controller detects/encounters a critical failure, the process may continue to step 340, described further below.

Otherwise, at step 320, in response to no critical failures for the post-gate checks, the controller may release the lock on the alternative source contactor (e.g., controlled switch 220A). Moving on to step 322, the controller may close the alternate source contactor. Further, at step 324, the controller may measure the source voltage (e.g., using sensor 232A and/or sensor 232C), which in some examples may include detecting the corresponding waveform.

At step 326, the controller may determine if the source voltage is within spec (e.g., satisfies one or more voltage thresholds). If the source voltage of the alternate source does not satisfy the thresholds, the process may proceed to step 346, described further below. Otherwise, at step 328, in response to the alternate source voltage being within spec, the controller may perform power stage checks for the alternative source, such as checking SPDs, rectifiers, etc. as described herein. At step 330, the controller may report any failures encountered, as described further below, and accordingly complete the STS startup.

If the controller encounters one or more failures, the controller may take appropriate steps. For instance, at step 332, in response to the source voltage not being within spec, the controller may report the deviations, and/or take mitigating actions when needed, such as opening a contactor (e.g., controlled switch 220B) to address overvoltage, dv/dt, DC, floating neutral, etc.

In another failure example, at step 334, in response to detecting a failure for the pre-gate checks, the controller may report the failure, and/or take a mitigating action (e.g., performing a gate lock at semiconductor switch 222B). At step 336, the controller determines whether the failure allows for starting up an alternative source (e.g., power source 212A). If the failure is critical and does not allow for an alternative source, at step 338, the controller may perform a safety/failure lockout (e.g., of semiconductor switch 222A) and end the startup process. Otherwise, the process may continue to step 342, described further below.

In yet another failure example, at step 340, in response to a critical failure for the post-gate checks, the controller may report the failure and also ungate the source (e.g., semiconductor switch 222B), and take further mitigating actions as needed.

In response to various failure statuses as described above, at step 342, the controller may lockout the preferred source contactor (e.g., controlled switch 220B). Proceeding to step 344, the controller may attempt starting up the alternative source (e.g., power source 212A, which in some examples may be designated as the primary/preferred source and proceed as described herein).

In a further failure example, at step 346, if the alternative source voltage fails to satisfy the corresponding thresholds, the controller may report the detected deviations, and take mitigating actions when needed, such as opening a contactor (e.g., controlled switch 220A) and/or other actions as described herein.

One example start-up sequence of flow chart 300 with no problems/failures detected may include performing a health assessment on the preferred source (e.g., power source 212B) and closing a contactor (e.g., controlled switch 220B) corresponding to the preferred source assembly (e.g., steps 302-306). Next, the sequence may include performing a pre-gate health assessment of the power stage (e.g., steps 310-312).

The sequence may then include gating (e.g., step 314) the preferred source AC switch (e.g., semiconductor switch 222B). The sequence may next include performing a post-gate health assessment of the power stage (e.g., steps 316-318). The sequence may continue with ungating the pre-ferred source AC switch, closing a load contactor (e.g., output controlled switch 224), gate the preferred source AC Switch (e.g., a soft start). The sequence may also include performing a load health assessment.

The sequence may further include performing a health assessment (e.g., steps 320-328) on an alternate source (e.g., power source 212A) and closing alternate source contactor (e.g., controlled switch 220A).

Figure 4:
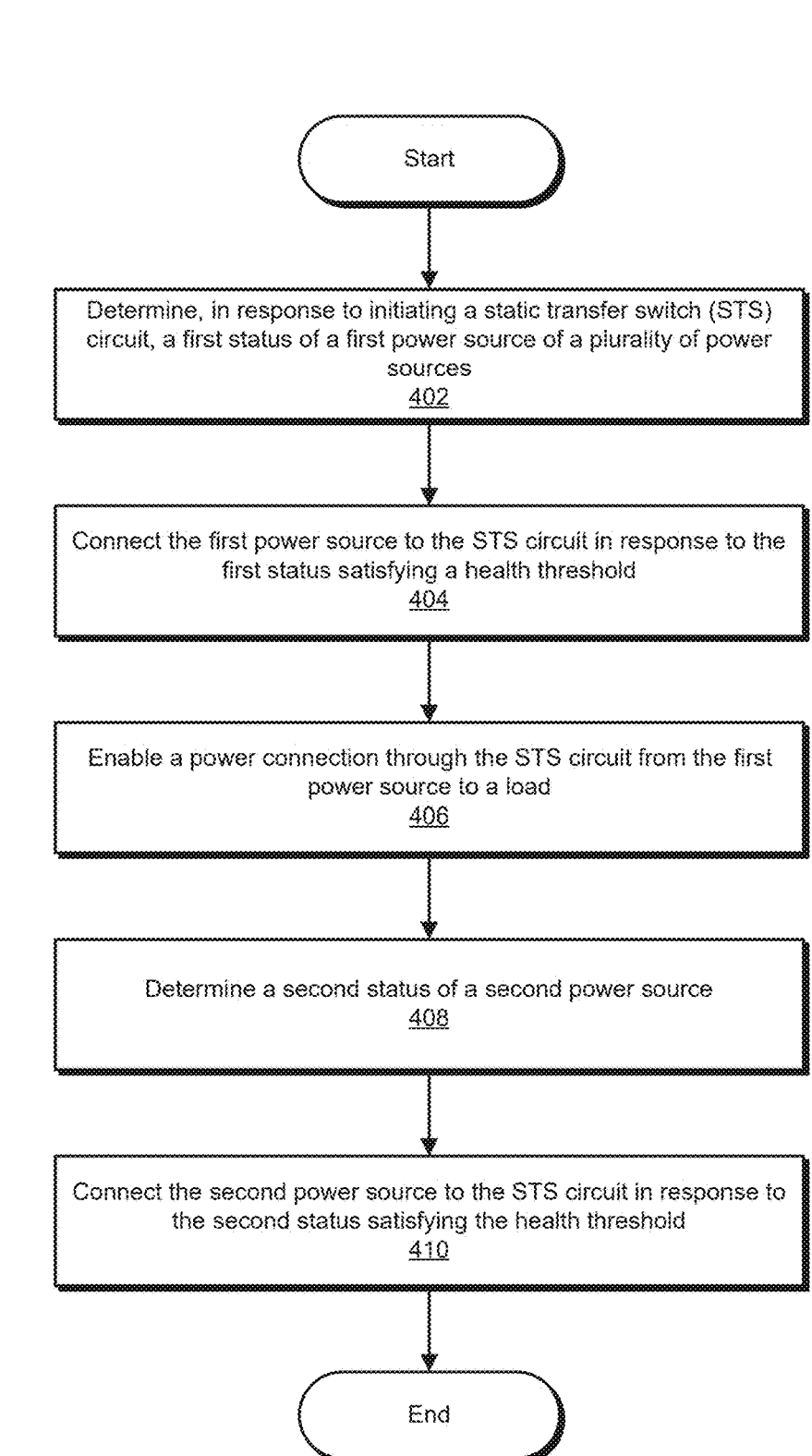
FIG. 4 is a flow diagram of an exemplary method for automatic startup of an STS.

FIG. 4 is a flow diagram of an exemplary method 400 for an automatic start up for an STS. The steps shown in FIG. 4 can be performed by any suitable system, including the system(s) illustrated in FIGS. 1 and/or 2. In one example, each of the steps shown in FIG. 4 represent an algorithm whose structure includes and/or is represented by multiple sub-steps, examples of which will be provided in greater detail below. Further, in some implementations, method 400 may correspond to the process illustrated in FIG. 3.

As illustrated in FIG. 4, at step 402 one or more of the systems described herein may determine, in response to initiating a static transfer switch (STS) circuit, a first status of a first power source of a plurality of power sources (see also, e.g., steps 304-306 in FIG. 3). For example, controller 130 may determine a first status of power source 112A in response to initiating STS 110.

The systems described herein may perform step 402 in a variety of ways. In one example, the first power source (e.g., power source 112A) corresponds to a preferred power source, such that another power source (e.g., power source 112B) may correspond to an alternative power source, although in other examples the preferred and alternate source designations may differ. In some examples, the first status may correspond to a voltage measurement (e.g., as measured by sensors 132 such as a voltmeter or similar) and the health threshold may correspond to a voltage threshold (e.g., an overvoltage, an undervoltage, etc.). In some examples, controller 130 may lock the second controlled switch (e.g., controlled switch 120B) for the alternative power source (e.g., power source 112B or other alternative source) before determining the first status (see also, e.g., step 302 in FIG. 3).

At step 404 one or more of the systems described herein may connect the first power source to the STS circuit in response to the first status satisfying a health threshold (see also, e.g., steps 308-312 in FIG. 3). For example, controller 130 may connect power source 112A to STS 110 in response to the first status satisfying the health threshold.

The systems described herein may perform step 404 in a variety of ways. In one example, connecting the first power source to the STS circuit may include closing a controlled switch (e.g., controlled switch 120A) that is selectively coupled between the STS circuit (e.g., STS 110) and the first power source (e.g., power source 112A). In some examples, as described above, connecting the first power source to the STS circuit may further include health assessments at inter-vening stages. For example, controller 130 may determine a pre-gate status of a power stage of the STS circuit after closing the controlled switch (e.g., corresponding to a stage between controlled switch 120A and semiconductor switch 122A).

In some examples, controller 130 may further close, in response to the pre-gate status satisfying a pre-gate thresh-old, a semiconductor switch (e.g., semiconductor switch

122A) selectively coupled between the controlled switch and the STS circuit (see, also, e.g., step 314 in FIG. 3). In some implementations, the pre-gate threshold may corre-spond to a power surge (e.g., sensors 132 detecting a power surge corresponding to a failure status).

At step 406 one or more of the systems described herein may enable a power connection through the STS circuit from the first power source to a load (see also, e.g., step 314 in FIG. 3). For example, controller 130 may enable the power connection through STS 110 from power source 112A to load 114.

The systems described herein may perform step 406 in a variety of ways. In one example, enabling the power con-nection further may include determining a post-gate status of the power stage of the STS circuit after closing the semi-conductor switch. For instance, controller 130 may detect the post-gate status (e.g., via sensors 132 between semicon-ductor switch 122A and output controlled switch 124), and in response to the post-gate status satisfying a post-gate threshold, controller 130 may close output controlled switch 124 to complete the connection from power source 112A to load 114. Moreover, in some implementations, controller 130 may also determine a load health status after enabling the power connection (e.g., via sensors 132 between output controlled switch 124 and load 114).

At step 408 one or more of the systems described herein may determine a second status of a second power source (see also, e.g., step 316 in FIG. 3). For example, controller 130 may determine a second status corresponding to power source 112B.

The systems described herein may perform step 408 in a variety of ways. In one example, determining the second status include unlocking the second controlled switch (e.g., controlled switch 120B that may have previously been locked when determining a health of power source 112A).

At step 410 one or more of the systems described herein may connect the second power source to the STS circuit in response to the second status satisfying the health threshold (see also, e.g., steps 318-322 in FIG. 3). For example, controller 130 may connect power source 112B to STS 110, although in some scenarios without connecting to load 114.

The systems described herein may perform step 410 in a variety of ways. In one example, connecting the second power source to the STS circuit includes closing a second controlled switch (e.g., controlled switch 120B) that is selectively coupled between the STS circuit (e.g., STS 110) and the second power source (e.g., power source 112B). In some examples, controller 130 may perform additional health assessments at each stage (e.g., similar to power source 112A as described above) such that power source 112B may be considered available as an alternative source to power source 112A (see also, e.g., steps 324-328 in FIG. 3).

Moreover, method 400 may in some implementations include performing a mitigating action in response to detect-ing a failure status (e.g., any failure status described herein and/or any failure to satisfy a threshold described herein). As also described herein, the mitigating action may correspond to at least one of controller 130 reporting the failure status, disconnecting an associated connection, attempting an alter-nate power source, and/or taking other appropriate actions (see also, e.g., steps 332, steps 334-344, and step 346 in FIG. 3).

As detailed above, Static Transfer Switches (STS) with manually operated switches/breakers may have disadvan-tages such as requiring full human intervention to fully start-up the STS at all stages of its life, whether starting for the first time, or restarting after an outage. When power is restored to the STS after an outage, power is applied to the STS power stage before the STS logic can boot. In some cases, this may lead to damage (e.g., due to overvoltage, dv/dt, etc.) to the STS and/or the load, without the STS being able to take action.

Additionally, if during the outage event the power stage is damaged in some manner (due to source of the outage, such as a lighting strike), and power is uncontrollably applied to power stage, the damage to the power stage can be exacerbated and can propagate to other sections of the STS, without the unit being able to take action until fully booted.

A STS as provided herein may include, in some implementations, a contactor at the input of each STS AC switch (e.g., on each source), an AC switch for each source connected to the STS, and a contactor at the output of the STS. The STS may further include a control system that may monitor the status and health of the sources, monitor the status and health of the STS, control the opening/closing of the contactors, control the gating of the AC switches, and monitor the status the health of the load. Corresponding methods for implementing an automatic start-up in the STS is further described herein.

In some examples, the STS may advantageously be able to start up with minimal human intervention. The STS provided herein may include hardware to perform self-health checks on both power stages during the start-up process, with various failure handling capabilities. Further, the STS provided herein advantageously may be able to automatically restart on either source following a blackout/unplanned outage event.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
   a plurality of controlled switches corresponding to a plurality of power sources;
   an output controlled switch corresponding to a load;
   a static transfer switch (STS) circuit coupled to the plurality of power sources and the load using the plurality of controlled switches and the output controlled switch, respectively, wherein the STS circuit further comprises:
      a plurality of sensor nodes corresponding to a plurality of power stages between each of the plurality of power sources and the load;
   a controller configured to:
      monitor the plurality of power sources and the load using the plurality of sensor nodes; and
      control the plurality of controlled switches and the output controlled switch.

2. The system of claim 1, wherein the controller is configured to:
   determine, in response to initiating the STS circuit, a first status of a first power source of the plurality of power sources;
   connect the first power source to the STS circuit in response to the first status satisfying a health threshold by closing a corresponding first controlled switch of the plurality of controlled switches;
   enable a power connection through the STS circuit from the first power source to the load;
   determine a second status of a second power source of the plurality of power sources; and
   connect the second power source to the STS circuit in response to the second status satisfying the health threshold.

3. The system of claim 2, further comprising a semiconductor switch for each of the plurality of power sources, wherein each semiconductor switch is coupled between a respective one the plurality of controlled switches and the STS circuit.

4. The system of claim 3, wherein connecting the first power source to the STS circuit further includes:
   determining a pre-gate status of a power stage associated with the STS circuit after closing the first controlled switch; and
   closing, in response to the pre-gate status satisfying a pre-gate threshold, the corresponding semiconductor switch.

5. The system of claim 4, wherein enabling the power connection further comprises determining a post-gate status of the power stage associated with the STS circuit after closing the semiconductor switch.

6. The system of claim 2, wherein the controller is further configured to determine a load health status after enabling the power connection.

7. The system of claim 1, wherein the controller is further configured to perform a mitigating action in response to detecting a failure status, and the mitigating action corresponds to at least one of:
   reporting the failure status;
   disconnecting an associated connection; or
   attempting an alternate power source.

8. A method comprising:
   determining, in response to initiating a static transfer switch (STS) circuit coupled to a load, a first status of a first power source of a plurality of power sources using at least one of a first plurality of sensor nodes corresponding to a first plurality of power stages between the first power source and the load;
   connecting the first power source to the STS circuit in response to the first status satisfying a health threshold;
   enabling a power connection through the STS circuit from the first power source to the load;

determining a second status of a second power source using at least one of a second plurality of sensor nodes corresponding to a second plurality of power stages between the second power source and the load; and connecting the second power source to the STS circuit in response to the second status satisfying the health threshold.

9. The method of claim 8, wherein the first power source corresponds to a preferred power source.

10. The method of claim 8, wherein connecting the first power source to the STS circuit includes closing a controlled switch that is coupled between the STS circuit and the first power source.

11. The method of claim 10, wherein connecting the first power source to the STS circuit further includes:

determining a pre-gate status of a power stage associated with the STS circuit after closing the controlled switch; and closing, in response to the pre-gate status satisfying a pre-gate threshold, a semiconductor switch coupled between the controlled switch and the STS circuit.

12. The method of claim 11, wherein the pre-gate threshold corresponds to a power surge.

13. The method of claim 11, wherein enabling the power connection further comprises determining a post-gate status of the power stage associated with the STS circuit after closing the semiconductor switch.

14. The method of claim 8, further comprising determining a load health status after enabling the power connection.

15. The method of claim 8, wherein connecting the second power source to the STS circuit includes closing a second controlled switch that is coupled between the STS circuit and the second power source.

16. The method of claim 15, further comprising locking the second controlled switch before determining the first status.

17. The method of claim 16, wherein determining the second status further comprises unlocking the second controlled switch.

18. The method of claim 8, wherein the first status corresponds to a voltage measurement and the health threshold corresponds to a voltage threshold.

19. The method of claim 8, further comprising performing a mitigating action in response to detecting a failure status, wherein the mitigating action corresponds to at least one of:

reporting the failure status;

disconnecting an associated connection; or attempting an alternate power source.

20. A controller configured to perform operations comprising:

determining, in response to initiating a static transfer switch (STS) circuit coupled to a load, a first status of a first power source of a plurality of power sources using at least one of a first plurality of sensor nodes corresponding to a first plurality of power stages between the first power source and the load;

connecting the first power source to the STS circuit in response to the first status satisfying a health threshold;

enabling a power connection through the STS circuit from the first power source to the load;

determining a second status of a second power source using at least one of a second plurality of sensor nodes corresponding to a second plurality of power stages between the second power source and the load; and connecting the second power source to the STS circuit in response to the second status satisfying the health threshold.

* * * * *